United States Patent [19]

Nockemann et al.

[11] Patent Number: 5,770,530
[45] Date of Patent: Jun. 23, 1998

[54] PROTECTIVE LAYER, PARTICULARLY ANTI-VANDALISM PROTECTIVE LAYER

[75] Inventors: Hans Nockemann, Wuppertal; Bruno Schwarz, Oberlaudenbach, both of Germany

[73] Assignee: Happich Fahrzeug-und Industrieteile GmbH, Wuppertal, Germany

[21] Appl. No.: 548,054

[22] Filed: Oct. 25, 1995

[30] Foreign Application Priority Data

Oct. 25, 1994 [DE] Germany .......................... 44 38 013.5

[51] Int. Cl.[6] .................................................. B32B 5/06
[52] U.S. Cl. ........................ 442/319; 442/373; 442/402; 442/308; 428/911
[58] Field of Search .................... 428/229, 257, 428/246, 282, 284, 300, 911; 442/304, 319, 373, 402, 308

[56] References Cited

U.S. PATENT DOCUMENTS

| 5,070,540 | 12/1991 | Bettcher et al. | 428/911 |
| 5,149,582 | 9/1992 | LaMarca, II et al. | 428/300 |
| 5,545,470 | 8/1996 | Schuster et al. | 428/229 |

FOREIGN PATENT DOCUMENTS

| 5227286 | 8/1986 | Australia . | |
| 0190064 | 8/1986 | European Pat. Off. . | |
| 0355879 | 2/1990 | European Pat. Off. . | |
| 0512382 | 11/1992 | European Pat. Off. . | |
| 8519307 | 7/1987 | France . | |
| 3545071 | 6/1987 | Germany . | |
| 3702639 | 7/1987 | Germany . | |
| 9004625 | 6/1990 | Germany . | |
| 9206365 | 8/1992 | Germany . | |
| 9217352 | 3/1993 | Germany . | |
| 4401417 | 7/1994 | Germany . | |
| 2204235 | 11/1988 | United Kingdom . | |

*Primary Examiner*—Marion E. McCamish
*Assistant Examiner*—Elizabeth M. Cole
*Attorney, Agent, or Firm*—Brinks Hofer Gilson & Lione

[57] ABSTRACT

A protective layer, in particular an anti-vandalism protective layer, for car seats, car roofs, convertible tops, car tarpaulins, tents, supporting air parts, wall linings, shatter-proof walls, and bullet-proof vests is comprised of a cover layer, a cut resisting material layer of cut resisting fibers, such as aromatic polyamide fibers, polyethylene fibers spun by the gel-spin process or glass fibers, a sheathed wire of a diameter of 0.1 to 2 mm contained in a threads which protrude out of the plane of the cut resisting layer and toward the cover layer, and a textile non-woven layer applied to one side of the cut resisting material layer by needling and then attached to the cover layer by adhesive bonding.

12 Claims, 2 Drawing Sheets

PROTECTIVE LAYER, PARTICULARLY ANTI-VANDALISM PROTECTIVE LAYER

BACKGROUND OF THE INVENTION

The present invention relates to a protective layer, in particular an anti-vandalism protective layer for car seats, car roofs, convertible tops, car covers, tents, air halls, wall coverings, as well as for shatter-proof walls and bullet-proof vests.

Particularly in public transportation vehicles such as railways, buses, etc., vandalism in the form of damage to seat coverings, particularly by their being cut, is increasing. For this reason, when public transportation operators equip new cars or replace damaged seats, they are being forced to take measures to counteract the vandalism. Interest in cut proof seat coverings has therefore recently increased greatly.

However, not only are seats of vehicles endangered by vandalism, increasing vandalism is also noted, frequently as an adjunct to intended theft, for folding roofs and convertible tops of cars, covering tarpaulins for trucks or other vehicles for the transportation of goods, as well as for tents, air halls and other structures in the field of textile construction, and also wall coverings, for instance impact walls in sports arenas, or public transportation.

In order to prevent vandalism, or at least make it more difficult, different solutions have been proposed particularly for car seats.

Federal Republic of Germany A 3 702 639 suggests applying a fine mesh metal fabric between the upper fabric layer of a seat covering and the foam material which forms the body of the seat. A similar suggestion is proposed in British A 2 204 235.

Knitted goods of wire or metal fibers are described in Federal Republic of Germany U 90 04 625 and EP-A 190 064.

Flat structures of metal wires or metal fibers however, have considerable disadvantages as an anti-vandalism protective layer, particularly for car seats. This is evident both in the production of the seats and particularly in their use. The anti-vandalism protective layers are customarily arranged below the actual seat covering, since it is only when they are at this location that they can provide their protective action without being noticed by the user or by a vandal. Such flat structures of metal wires and metal fibers are relatively difficult to work due to their minimal flexibility. Particularly when they bridge over non-planar surfaces, as is necessary to a large extent in the production of vehicle seats, additional cutting or notching processes are necessary. This has a negative effect on the cost of production.

The disadvantages of anti-vandalism protective layers of metal wires or metal fibers are evident upon their use. Such anti-vandalism protective layers impair the comfort of the seat considerably, producing a harder and thus less comfortable sitting surface.

However, constant detachment in use of individual torn wires is a particular problem. They may push through the actual seat covering and protrude from the surface of the seat, frequently without being sufficiently visible. Then users of public transportation can be injured. For this reason also, operators of public transportation want to replace these known anti-vandalism protective layers with more suitable materials.

Therefore, anti-vandalism protective layers of cut proof textile fibers have also been disclosed. Austrian A 86-52 272 discloses an anti-vandalism protective layer formed of a fabric, or a needled felt or aromatic polyamide fibers—aramid fibers—and this layer is bonded to the outer fabric. A needled felt of aramid fibers serving as an anti-vandalism protective layer is also mentioned in EP-A 355 879.

Neither woven fabrics nor needled felts of aromatic polyamide fibers, however, provide necessary resistance to cutting and stabbing. While these solutions do not have the disadvantages of the anti-vandalism protective layers of metal, they also do not satisfy the demands on anti-vandalism protective layers with regard to resistance to cutting and stabbing.

Two anti-vandalism layers, one consisting of a metal grid and the other of aramid fibers, are described in French A 2 592 334. This reduces the above mentioned disadvantages somewhat, but does not reduce the danger of an injury from protruding wires and the disadvantage of the poorer workability of anti-vandalism protective layers of metal. In addition, this solution also has higher production costs than are involved in working on a uniform anti-vandalism protective layer.

A protective layer which may comprise different surface structures and very different materials, such as glass fibers, polyester fibers, ceramic fibers, aromatic polyamide fibers, or carbon fibers, is disclosed in EP-A-512 382. These fiber materials may be present in the form of grids, nettings, or woven or knitted products. However, there is no indication as to the nature of such a protective layer which is required to assure sufficient resistance to vandalism.

German Unexamined Application for Patent 44 01 417 discloses an anti-vandalism seat covering comprised of a flocked flat textile structure having a base material which is formed, at least in part, of a cut resistant fiber, for instance an aramid fiber, and having a pile produced by flocking on its surface. This anti-vandalism seat covering comprises a knitted or non-woven fibers material which has a comparatively better resistance to cutting than woven materials and its flexibility facilitates its being worked into seat coverings. Furthermore, the loss in strength of the yarns of aramid fibers upon production in knitted or non-woven fibers materials is less than upon production in woven materials. This known anti-vandalism seat covering is suitable for use directly, without a cover layer, as a seat covering as a result of its flocking.

As compared with this, German Patent 35 45 071 describes a covering material for fire proof seat cushions which also affords protection against vandalism. This covering material for seat cushions having a flammable foam cushioning has an outer textile layer and an anti-fire and anti-vandalism protective layer arranged on the side facing the foam cushioning, and the protective layer is firmly attached to the textile layer. The fire proof, anti-vandalism protective layer has a reinforcement insert of wire and can be knitted using this wire thread. This covering material does not have satisfactory working properties due to the firm attachment between the textile layer and the fire proof, anti-vandalism protective layer.

Finally, German Utility Model G 92 17 352 describes a multilayer covering of a bellows for a flexible transition which is comprised of a cover layer of a coated fabric, an insert of metal wires developed as knitted material which are vulcanized into a layer of rubber and a non-woven which is backed onto the rear side. This multilayer covering is also difficult to work in view of the firm attachment between the cover layer and the insert, and the non-woven which is backed on the rear serves only as additional heat insulation or as an additional obstacle upon stabbing through the cover.

SUMMARY OF THE INVENTION

It is an object of the present invention to provide a protective layer, particularly an anti-vandalism protective layer, which has satisfactory workability, high resistance to stabbing and cutting, and little danger of inflicting injuries to users of the protective layer from contact with the layer, and thus permits inexpensive manufacture and working.

Another object is to provide an anti-vandalism protective layer which is difficult to burn so as to be able to satisfy the need of operators of public transportation for flame retardant properties of the anti-vandalism protective layer.

According to the invention, a protective layer, in particular an anti-vandalism protective layer, for car seats, car roofs (but typically not the liners for metal roofs), convertible tops, car tarpaulins, tents, supporting air parts, wall linings, shatter-proof walls, and bullet-proof vests is comprised of several layers.

There is a cover layer of upholstery, for example, which is on the exterior of the protective layer. On the inward side of the cover layer, there is a cut resisting layer of cut resistant fibers which are arranged in a form that enables them to absorb the pressure applied to them by an attempt to cut the protective layer and then to resist the cutting. The filaments or fibers of this cut resisting layer are securely held within their layer, but each fiber is held in a manner permitting it to shift in position without breaking or tearing or being cut. For example, the fibers of this layer may be loosely knitted, or secured at relatively widely spaced apart locations which hold the fibers relative to one another, yet permit relative shifting of the fibers. After that initial shift has been completed, then the cut resisting character of the fibers is relied upon. The materials of the fibers of the cut resisting layers may be aromatic polyamide fibers, polyethylene fibers spun by the gel-spin process or glass fibers, all of which resist being cut, yet are flexible enough to shift in position and/or bend slightly as pressure is applied to the fibers. Some of the fibers may comprise a sheathed wire of a diameter of 0.1 to 2 mm contained in the thread system. Some of the fibers may protrude out of the plane of the cut resisting material and toward the cover layer, either as actually protruding or because some fibers lie on or across others. The protruding fibers aid in holding the layers together.

A textile non-woven layer is applied at least to one side of the cut resisting material layer by needling and is later attached to the cover layer by bonding. Needling of the fibers of the non-woven layer into the cut resisting layer provides an unbonded connection between them, allowing the cut resisting layer to slide with reference to the cover layer due to the yieldability of the fibers of the non-woven layer that are needled into the cut resisting layer. This avoids stiffness of a protective layer that would occur if the cut resisting layer were instead directly bonded to the cover layer. Variations in the above might include an additional non-woven layer on the opposite surface of the cut resisting layer.

Detailed below are particulars of these features described above.

DESCRIPTION OF PREFERRED EMBODIMENTS

Figure 1:
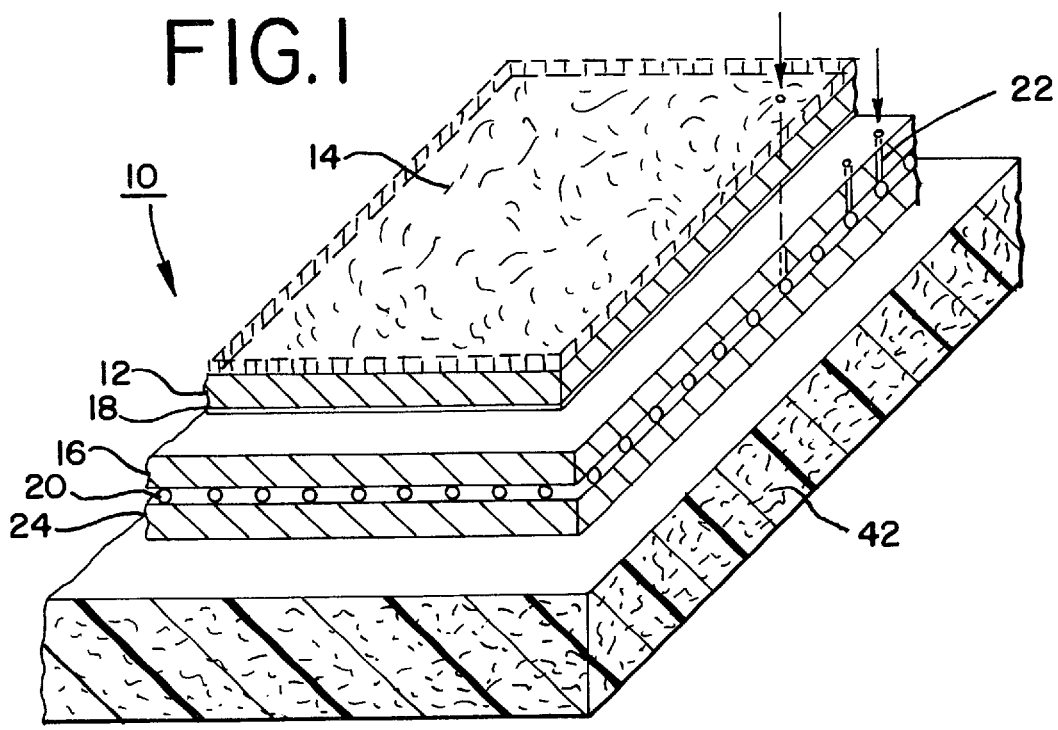
FIG. 1 is a broken away perspective schematic view of one embodiment of a protective layer.

The basic embodiment shown in FIG. 1 is of a protective layer 10, comprising a cover layer 12, which may be the external exposed surface of the protective layer. If the layer 12 is at the exterior of the seat on which that layer is applied, its exterior is covered by a textured fabric or filament material 14, the surface of upholstery. In fact, the layer 12, 14 may be conventional seat upholstery.

Beneath the cover layer is a non-woven textile layer 16 of fine filaments. The cover layer 12 and the non-woven layer 16 are bonded together, preferably by an applied adhesive layer 18. The bonding is done after the below described assembly of the layers 16 and 20.

Figure 2:
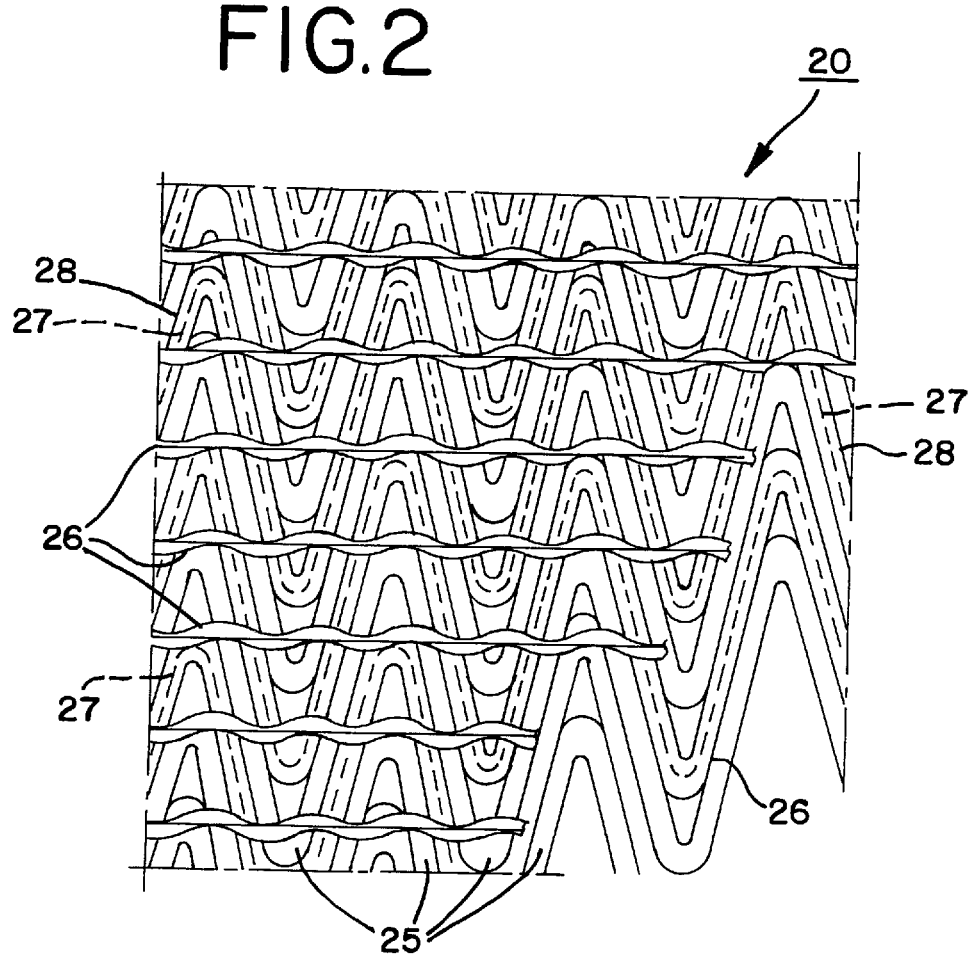
FIG. 2 is an enlarged schematic, surface view of a fragment of the knitted material layer of the protective layer.

The next cut resistant layer is a knit layer 20 and may be of the type seen in FIG. 2. Its significant characteristic for this invention is that it includes many fibers that are held in their positions, yet are free to bend or deflect and thereby absorb force and pressure when an attempt is made to cut them. After they have deflected, if the pressure to cut them continues, the fibers are of cut resistant material so that their being cut is at least inhibited if not prevented. To hold the cut resistant layer to the non-woven textile layer, the non-woven is needled, as at 22, into the cut resisting layer, by numerous filaments of the non-woven being needled. Needling is described, for example in U.S. Pat. Nos. 3,532,588 and 3,122,141. So much of the fibers of the non-woven layer are needled through the cut resisting layer that they form another layer 24 of fibers of the textile non-woven at the opposite surface of the cut resisting layer. If desired, yet another non-woven layer can be applied to the layer 24 and can be needled to the cut resisting layer from that side of the layer 20 away from the cover layer 12.

The cut resisting filament material 25 is made cut resistant first by the way the fibers thereof are positioned and secured in that layer and secondly by inclusion therein of cut proof wire, examples of which are described below. As shown in FIG. 2, the fibers of the cut resisting layer are supported to be able to shift, deflect and bend. In one example of the layer 20 shown in FIG. 2, a large quantity of filaments or fibers 25 are positioned one above the other to define a layer, with each filament arranged along an undulating path across the layer 20. Each filament 25 is wrapped by spaced apart warp filaments or cross filaments 26. Each cross filament wraps around each filament 25 that each cross filament 26 intersects along its path across the layer 20. This produces a sturdy form cut resisting layer 20. The individual fibers are all fixed in position in the layer and with respect to each other. But they are secured by the cross filaments which are spaced far enough apart that the filaments 25 have freedom to deflect and bend when pressure is applied to them.

As the second noted feature, either some of the filaments 25 of that layer 20 are themselves wires or preferably or comprises a wire 27 which is sheathed in a respective, wound, knitted or braided covering 28 of the cut resisting filament material. The wires strengthen the protective layer and are present in a sufficient quantity of the filaments 25, either in all or preferably in a large portion of the filaments, sufficient to make the layer 20 cut resistant. Yet, wires that are sheathed do not easily project out of the plane of the cut resisting layer without the respective filaments also projecting out.

Covering over the cut resistant layer 20 with a textile non-woven layer 16 enables the cut resisting layer 20 to be bonded to the cover layer 12 with possible relative movement or play between the layers 16 and 20. The needling 22 of the non-woven layer 16 into the cut resisting layer connects those layers only through the needled fibers, so that the combination retains a certain mobility with respect to the cover layer 12, 14. The non-woven layer 16 is bonded, by adhesive, for example, directly to the cover layer. But this does not also bond the cover layer to the cut resisting layer and their relative mobility is retained. Preferably, some of the filaments, e.g, the warp filaments 26, or some of the wires project out of the plane of the cut resisting layer and toward the cover layer to better engage with the non-woven layer. Further, those few projecting filaments or wires can be bonded, as by adhesive, along with the non-woven layer. If a cushioning material is used as the cover layer, the cushioning material provided as part of the protective layer retains, in principle, its textile character and can be worked like a cushioning material since no reduction in the elasticity or stretchability is caused by the remainder of the protective layer.

Despite the pressure of the protective layer, damage to the upholstery by stabbing with an instrument is still possible. However, the cutting and detachment of the upholstery material from the backed protective layer is made considerably difficult so that no gaping textile ends result and furthermore no tearing by hand is possible. Another advantage is that stabs or other damage to the surface can be repaired and/or sealed with textile adhesives available on the market.

The workability of the protective layer below a cushioning material is improved when each wire 27 is contained in at least one thread 28 which at least in some cases does protrude out of the plane of the knitted material. The wire in the thread and the threads are bendable so that, despite the inserted wires, the protective layer assures sufficient flexibility, which is particularly important also for good resistance to cutting.

A cushioning material prepared for working or a material for car convertible tops, car tarpaulins, tents, supporting air parts, wall coverings, shatter proof walls, and bullet proof vests can be produced using a cover layer 12 comprised of a woven fabric or of a foil which is bonded to the non-woven layer so that this material can be worked directly in a customary manner.

In order to increase the anti-vandalism effect or the effect of the protective layer as a shatterproof wall or a bulletproof vest, the non-woven layer 16 may also be comprised of cut proof fibers, such as aromatic polyamide fibers, polyethylene fibers spun by the gel-spin process or glass fibers.

Aromatic polyamide fibers are particularly well suited as cut proof textile fibers, particularly for the production of any layers within anti-vandalism protective layers. These fibers are frequently also referred to as aramid fibers. Another essential advantage of aramid fibers is their minimal burnability so that a special finishing with flame inhibiting agents upon the use of this type of fiber is not necessary. The condition of only minimal burnability is particularly useful for fibers for vehicle seats for public transportation. In addition, aromatic polyamide fibers also have very high strength.

Aside from aromatic polyamide fibers, polyethylene fibers, particularly polyethylene fibers produced by the gel-spin process, can be used for the production of the anti-vandalism protective layer. In contrast to aramid fibers, the other fibers do not have the advantage of only minimal burnability and can thus not be used for items, such as vehicle seats for public transportation, in which a minimal burnability property is required.

Glass fibers, which are nonburnable like aromatic polyamide fibers, can also be used to produce the anti-vandalism protective layer of the invention.

Aromatic polyamide fibers, polyethylene fibers spun by the gel-spin process, or glass fibers can be used in the anti-vandalism protective layer either by themselves or as mixtures either with these fibers or with other fibers. The selection of the fiber mixture and the mixture ratios should be determined so that the cut resisting properties and the reduced flammability are not negatively affected. The sole use of a cut resistant fiber as the textile component in the anti-vandalism protective layer is preferred. The sole use of aromatic polyamide fibers is particularly preferred. Cut resistant textile fibers are used in the anti-vandalism protective layer.

The weights per unit length of the yarns which are to be used for the production of the anti-vandalism protective layer of the invention lie within the range between denier 420 and 8500. A range between denier 1000 and 5000 is preferred, while a range of between denier 1500 and 3500 is particularly preferred. When selecting the weight per unit length of the yarn, a compromise must be made between the desired resistance to cutting and the comfort in use. Higher weights per unit length give a better resistance to cutting than lower ones, but lower weights per unit length are preferred to higher ones for comfort in sitting. The weight per unit length of the filaments of these yarns should be less than denier 5 and a range of between denier 0.5 and 3 is preferred.

The non-woven layer 16 is applied preferably on one side of the cut resisting layer 20 in the protective layer 10. The non-woven layer can be provided on both opposite sides, and, if that is done, both non-woven layers are provided on their outward sides with a continuously active layer of adhesive and a removable protective layer foil (not shown) over the adhesive layer. This is particularly favorable when the protective layer is to be worked with the cover layer to form a cushion for vehicle seats. A protective layer can be pre-worked completely and can then be bonded to the foam body of a seat after removal of the outer protective foil.

The layer of adhesive 18 can be sprayed on the non-woven layer or be applied as a foil which is adhesive on both sides. That adhesive is used to bond the non-woven layer to another layer.

For the production of the anti-vandalism protective layer of the invention, as shown in FIG. 2, the cut resisting material 20 is of the type shown. Generally, it is a knitted type of fabric and not a woven one. Alternately usable are a warp knitted material, and particularly preferably a knitted material produced on a Raschel or crochet galloon machine. Woven material is not recommended for the cut resistant layer. First, it is often too tightly woven, preventing the fibers from bending or deflecting when an attempt to cut them is made. Also, the directions of the woven fibers assure that no matter in which direction they are attempted to be cut, the fibers will be stressed, not merely to bend, but likely to be cut.

The weight per unit area of the material of the cut resisting layer can be between 100 and 2000 $g/m^2$. Below 100 $g/m^2$, sufficient resistance to cutting can no longer be obtained. A range of between 200 and 1000 $g/m^2$ is preferred, and in particular a range between 200 and 600 $g/m^2$. Experiments have shown that, in particular, the cut resistance required in public transportation can generally be suitably obtained within a range of 300 to 400 g/m². However, since the resistance to cutting is dependent also on certain other properties, for instance, the weight per unit length of the yarn, the range of 300 to 400 g/m² can shift upward or downward depending on the nature of the yarns used. Higher ranges of 500 to 700 g/m², and in particular of 700 to 1000 g/m², can definitely further improve the resistance to cutting, but they are not always realizable for economic reasons.

With respect to the stitch spacing between stitches along a warp filament 26 as shown in FIG. 2, values of between 1/cm and 20/cm have proven favorable. A range of 2/cm to 5/cm in which the desired resistance to cutting can be obtained is preferred.

In order to obtain a wire containing thread system which protrudes out of the plane of the knitted material 20, filling guide threads of aromatic polyamide fibers are laid, by means of a long bar, for instance between the mesh threads which are guided by a short bar, of for instance yarns of aromatic polyamide fibers. Further filling guide threads 26, which contain a wire 27 with a knitted covering 28, are placed over them by means of a figure bar. These wire containing threads 28 protrude out of the plane of the knitted material.

Another possibility is to operate with two long bars and to provide a wire with a knitted covering for the upper lapping produced by a long bar. In addition, by figure bar, another wire with a knitted covering is placed over the knitting threads. It is essential in this connection that the wire be contained in the long thread lappings since only in this way can a good resistance to cutting be obtained.

What lapping system for a cut resisting layer is used depends in particular on the intended field of use and on the cut resisting properties desired.

The wire 27 which is used in the anti-vandalism protective layer can be a solid wire, as wire yarn or as wire thread. The diameter of this wire should be between 0.1 and 2.0 mm; a range of between 0.2 and 0.6 mm is preferred.

Figure 3:
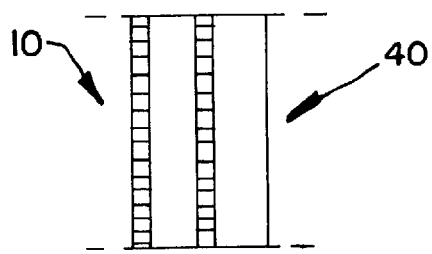
FIG. 3 illustrates a design with two neighboring protective layers.

The percentage by weight of the wire 27 in the cut resisting material 20 depends on a number of factors. Thus, a relatively small percentage can be used, if two or more anti-vandalism protective layers 10, 40 are used one above the other (FIG. 3) or if a particular embodiment involves several layers of cut resisting material within it. On the other hand, a higher percentage by weight of wire is required if, for instance, the cut resisting material 20 is not made from cut resistant fibers alone, but from mixtures of cut resistant fibers with non-cut resistant fibers are used. Therefore, the percentage by weight of the wire in the anti-vandalism protective layer of the invention can lie within a range of 10 to 90%, and preferably in a range of 20 to 60%.

Figure 4:
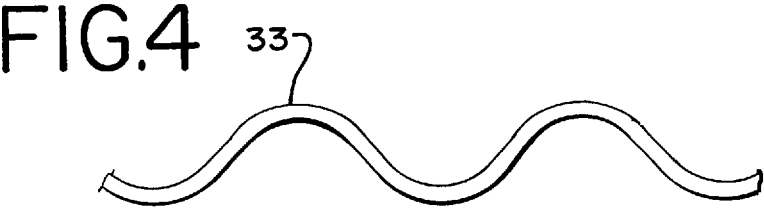
FIGS. 4 and 5 illustrate two alternative wires for inclusion in the knitted material layer.
Figure 5:
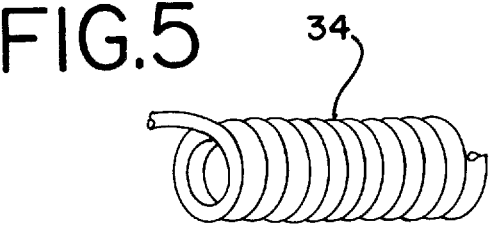

The wire 27 should have either undulated shape (33, FIG. 4) or a spiral shape (34, FIG. 5). For better workability, an undulated shape is preferred. Three essential advantages are obtained by an undulated shape.

Thus, the resistance to cutting of an anti-vandalism protective layer produced by the simultaneous use of an undulated wire is substantially better than by the use of a smooth untextured wire. The better resistance to cutting of goods produced with undulated wire can be explained, in particular, by the fact that an undulated wire takes up a larger area in the anti-vandalism protective layer as a whole than a smooth wire does. Upon insertion of a knife and, in particular, upon an attempt to pull the knife through the material to be cut, the probability of the knife striking against an undulated wire so that it cannot be pulled any further is substantially greater than of it striking a smooth wire. The advantage of the undulated wire makes itself noticeable, particularly when the cut resisting material is made from mixtures of cut resistant fibers with non-cut resistant fibers.

Another advantage is that there is less danger of an undulated wire working its way out from its position in the anti-vandalism protective layer and of causing injuries than of a smooth wire doing so. Due to its shape, the probability that the undulated wire will be pushed upward by the mechanical stresses upon the use of the seat and be pushed through the outer fabric and protrude out of the seat is definitely less than with a smooth, non-undulated wire.

A third advantage of the use of an undulated wire is the greater flexibility of the cut resisting material produced and thus its better workability.

With respect to the shape and the number of undulations, there are no particular limitations. A length ratio of 1:1.5 to 1:3.5 has proven favorable. In the length ratios indicated here, 1 is the length of the wire in its undulated or spiral condition, and the other number is the length of the wire after it has been stretched and pulled out.

The wire to be used in the anti-vandalism protective layer of the invention is preferably covered by a sheath of textile fibers. For this, the possibilities of spinning, wrapping, or braiding or of twisting around of the wire offer themselves. These methods are known to the person skilled in the art. The use of a wire 27 covered by knitting or braiding 28 is particularly preferred for the production of the anti-vandalism protective layer of the invention.

The wire is inserted in the cut resisting layer and is sheathed by additional formation of further stitches so that a knitted or braided, etc. material is produced as a covering for the wire. In the event of a possible break in the wire, the wire might work out of the anti-vandalism protective layer due to the mechanical stressing of the wire and thereafter cause injuries. The fiber covering on the wire would prevent this. Experiments have shown that the special structure of the covering layer produced by knitting around the wire substantially better protects the wire from protruding than do other methods of forming the sheathing, such as spinning, wrapping or twisting.

For knitting around the wire, yarns of any desired fiber materials can be used. For optimal resistance to the cutting of the anti-vandalism protective layer, use of a cut resisting fiber, such as an aromatic polyamide fiber, a polyethylene fiber produced by the gel-spin process, or a glass fiber is preferred. But, use of an aromatic polyamide fiber is particularly preferred.

The wire 27 to be used for the production of the anti-vandalism protective layer of the invention may have a sheathing of an easily melted polymer. All polymers can be used as a hot melt adhesive. Examples of such polymers are ethylene/vinyl-acetate copolymers, copolyamides, copolyesters, polyisobutylenes and polyvinylbutyrals.

A wire provided with a hot melt adhesive is preferably introduced into the lapping system particularly employed for the bonding upon the production of the wire covering. The anti-vandalism protective layer of the invention can thus contain both wires provided with hot melt adhesive as well as wires which do not have a covering of hot melt adhesive.

The anti-vandalism protective layer 10 of the invention is intended, in particular, for use in vehicle seats for public transportation. An outer fabric 14 may be arranged over this protective layer and will be part of the cover layer thereof as in FIG. 1. Any known car seat upholstery material is suitable. There are no limitations as to the nature of the fiber and the flat textile construction for the outer layer fabric. The outer fabric should be provided with a flame retarding finish or be produced using a fiber with a flame inhibiting agent spun therein. A pile material is particularly suitable as the outer fabric. When an attempt is made to slit the passenger seat, the knife is impeded by the anti-vandalism protective layer. Depending on the connection between the outer fabric and the remainder of the anti-vandalism protective layer, a short tear can be produced in the outer fabric. When using a pile woven material or a pile knitted material as the outer fabric, it is possible to cover the tear by a partial folding down of the pile upon further use of the seat, so that the tear is not easily visible. If a flat woven material or a flat knitted material is used as the outer fabric, the tear, on the other hand, is more evident.

Particularly when the anti-vandalism protective layer of the invention is used in car seats, the nature of its attachment is important. Direct bonding of the cut resisting layer 20 to the outer fabric or cover layer 12 over its entire surface is disadvantageous. For good resistance to cutting, it is important that the cut resisting material, which is arranged below the outer fabric as an anti-vandalism protective layer, be permitted a certain amount of movement relative to the cover layer. The resulting resistance to cutting is greater than for a cut resisting layer which is rigidly bonded over its entire surface to the outer fabric. The development of the cut resisting layer 20 in accordance with the invention, connected to the outer fabric 12 via a non-woven layer 16 needled at 22 to the cut resisting layer 20, provides the required mobility of the protective layer.

A layer of threads protruding out of the plane of the knitted material provides additional linear bonding of the cut resisting material to the non-woven layer without reducing the required mobility, and possibly without any great additional expense, for instance, by the application of adhesive between the layers by a roller. The layer of threads protruding out of the plane of the cut resisting material contains the wire, and the bonding is effected preferably to the wire containing thread system. A better adhesive effect is obtained at the wire containing places than at the places not containing wire. The linear bonding, on the other hand, however, affords the advantage of the possibility of good separability if, for instance, repair of the vehicle seat becomes necessary, for instance in order to replace the outer fabric.

Below the anti-vandalism protective layer 10, the vehicle seat generally includes a cushioning foam layer 42, preferably of polyurethane foam. In order to satisfy the requirement of low burnability, which is generally required in passenger seats for public transportation, it is advisable to admix flame inhibiting agents in the foam.

Although it can be used for the sitting surfaces of car seats, the anti-vandalism protective layer of the invention can also be used for the back rests of car seats in public transportation. The use of the anti-vandalism protective layer of the invention is not intended, however, to be limited to use for car seats or in public transportation. Numerous other fields of use are possible, for example, car tarpaulins, vehicle folding and sliding roofs, and convertible tops, wall linings such as, for instance, impact walls, tents, and air halls. This list is intended as examples and not as limitations. The anti-vandalism protective layer of the invention can be used wherever there is the danger that the cover layer formed of flat structures, generally flat textile structures or plastics, will be cut open for purposes of vandalism or theft.

The invention is not limited to the use of a single anti-vandalism protective layer in the articles mentioned and other similar articles. Two or more anti-vandalism protective layers may also be used in the same way as in FIG. 3.

The anti-vandalism protective layer described can be used as a protective layer also in articles which are not usual subjects of vandalism. Thus, the anti-vandalism protective layer of the invention, some or even all of the layers of which may preferably be produced from aromatic polyamide fibers, can be used in a particularly preferred manner in shatter-proof walls, for instance at airports. Due to the excellent anti-ballistic properties of aromatic polyamide fibers, the anti-vandalism protective layer of the invention, and particularly its cut resisting layer, provides good protection against forming splinters. It is advisable here to use several layers of the anti-vandalism protective layer, perhaps several of the cut resisting layers within one protective layer, i.e. under one cover layer. The protective layer can also be used in bullet-proof vests.

Effective protection against being cut is provided by the anti-vandalism protective layer of the invention. The anti-vandalism protective layer of the invention affords further advantages, such as little danger of injury upon the breaking of the wire inserts of the cut resisting layer and good separability particularly of the cut resisting layer of the anti-vandalism protective layer from the neighboring layers for possible repair work, with nevertheless good attachment to the adjoining layers. In public transportation, the poor burnability of the anti-vandalism protective layer upon the use of aromatic polyamide fibers or glass fibers is a particular advantage.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A protective layer comprising:
   a cover layer of woven seat upholstery fabric;
   a cut resisting layer of generally knitted material comprising cut resisting fibers selected from the group consisting of aromatic polyamide fibers, polyethylene fibers spun by the gel-spin process, or glass fibers, and further comprising a respective sheathed wire having a diameter of 0.1 to 2 mm contained among at least some of the fibers in the cut resisting layer, wherein some of the wires protrude toward the cover layer from a plane of the cut resisting layer; and
   a layer of textile nonwoven material applied by needling to at least one side of the cut resisting layer; and by linear bonding to the sheathed wires protruding from the plane of the cut resisting layer,
the nonwoven layer being connected by bonding to the cover layer.

2. The invention of claim 1, wherein the nonwoven layer comprises cut resistant fibers.

3. The invention of claim 2, wherein the nonwoven layer comprises fibers selected from the group consisting of aromatic polyamide fibers, polyethylene fibers spun by the gel-spin process, and glass fibers.

4. The invention of claim 1, wherein the nonwoven layer is provided with a permanent adhesive layer and a removable protective foil.

5. The invention of claim 1, wherein the cut resisting layer comprises a warp-knitted material.

6. The invention of claim 1, wherein the cut resisting material is a crochet galloon material.

7. The invention of claim 1, wherein the sheathed wire in the thread system has a diameter of 0.2 to 0.6 mm.

8. The invention of claim 1, wherein the wire is undulated in shape.

9. The invention of claim 1, wherein the wire is spiral in shape.

10. The invention of claim 1, wherein sheathing on the wire comprises an additional knitted material of textile yarn knitted around the wire.

11. The invention of claim 1, further comprising a polymer of low melting point covering the wire.

12. The invention of claim 9, wherein the sheathing on the wire comprises an additional knitted material of textile yarn knitted around the wire.

* * * * *